Aug. 20, 1940.     F. V. MAYO     2,212,241
LIQUID DISPENSING APPARATUS
Original Filed March 26, 1934    5 Sheets-Sheet 1
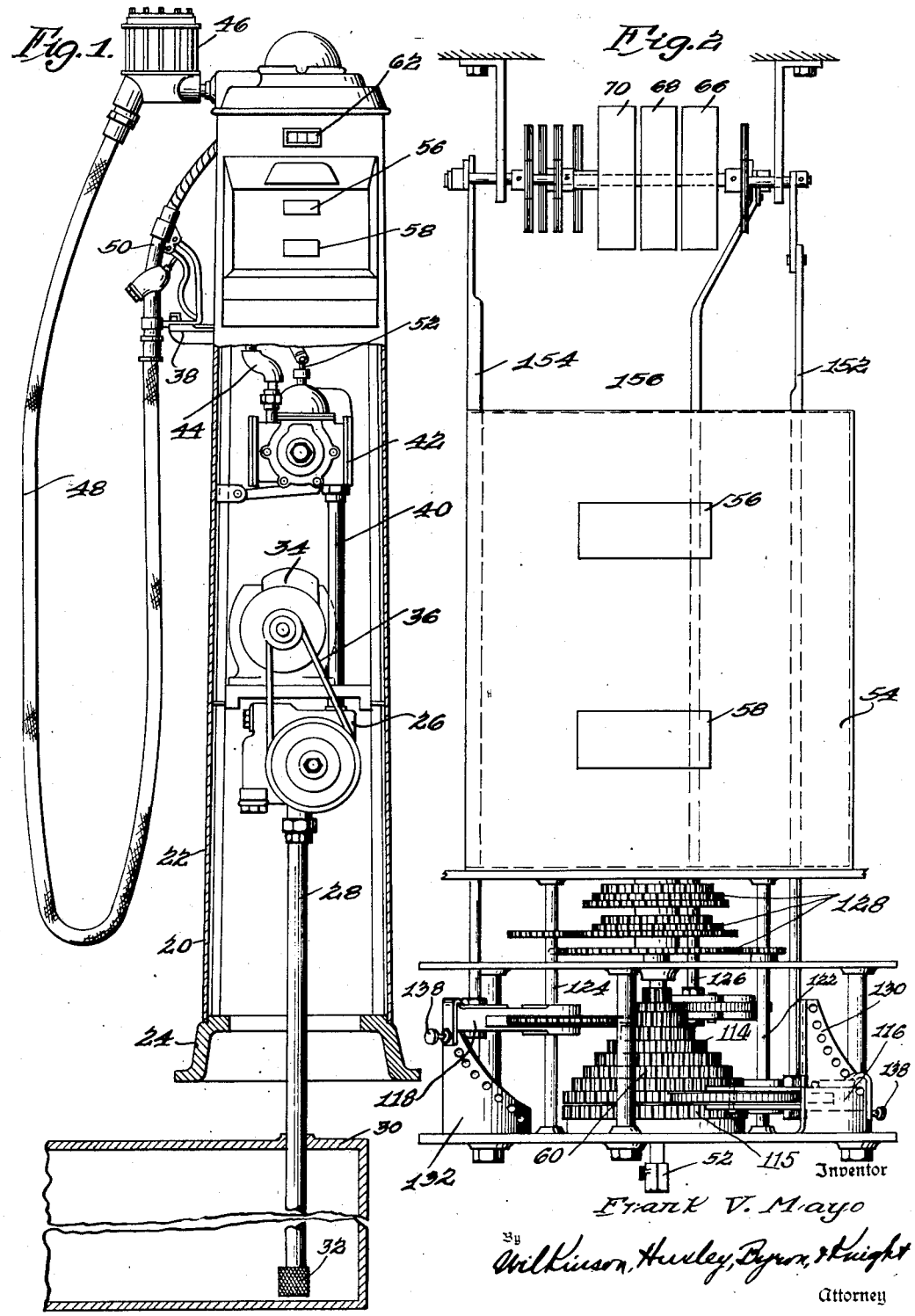
Inventor
Frank V. Mayo
By Wilkinson, Huxley, Byron & Knight
Attorney

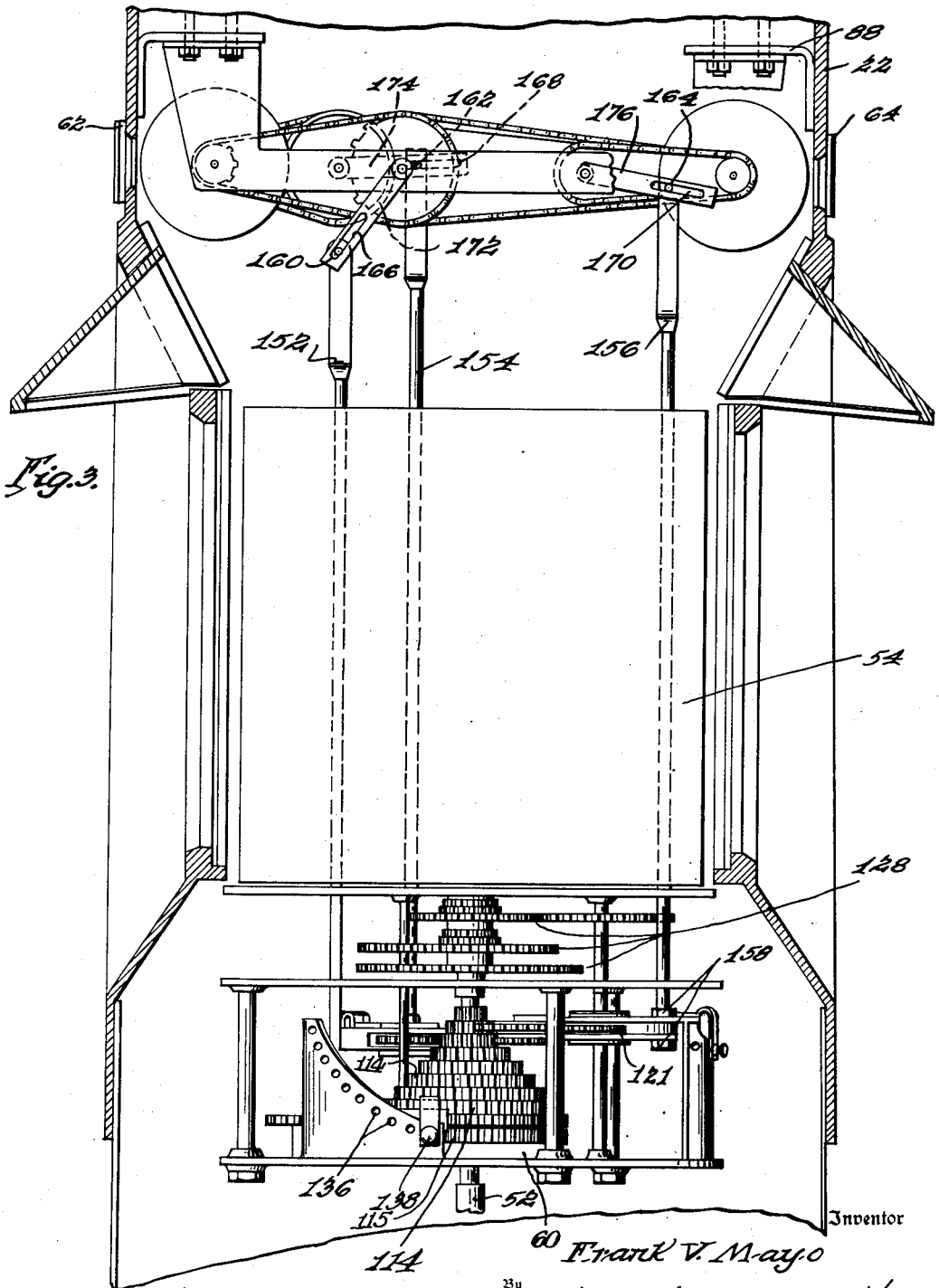

Inventor
Frank V. Mayo

Aug. 20, 1940.   F. V. MAYO   2,212,241
LIQUID DISPENSING APPARATUS
Original Filed March 26, 1934   5 Sheets-Sheet 5
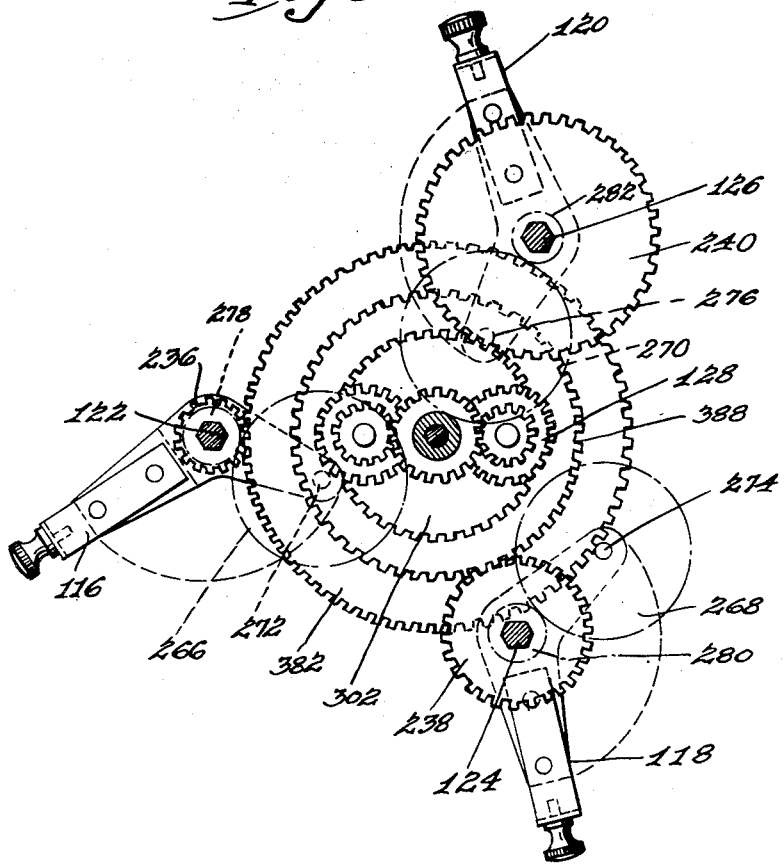
Inventor
Frank V. Mayo
By Wilkinson, Huxley, Byron & Knight
Attorney Patented Aug. 20, 1940

2,212,241

UNITED STATES PATENT OFFICE 2,212,241

LIQUID DISPENSING APPARATUS

Frank V. Mayo, Stockton, Calif., assignor to The Wayne Pump Company, Fort Wayne, Ind., a corporation of Maryland Original application March 26, 1934, Serial No. 717,495. Divided and this application October 27, 1938, Serial No. 237,362

8 Claims. (Cl. 74—283)

This invention pertains to liquid dispensing apparatus.

Liquid dispensing apparatus now in use are of two principal types, namely, the so-called visible type, and the meter type. The more desirable of these two types is the meter type, which consists essentially of an operating pump connected to a source of liquid supply, the pump being adapted to supply liquid to a meter where it is measured, after which it is dispensed through the usual hose and nozzle connection. The meter is adapted to operate a register, or clock as it is known in the motor fuel dispensing field, or other indicating mechanism to show the amount of liquid dispensed through the hose and nozzle. It is customary to provide this type of liquid dispensing apparatus with a card to be displayed somewhere on the casing adjacent the register, the card being used to compute the price of any amount of gasoline or other liquid dispensed from the device. The objections to this method of computation are that for different localities different cards must be used as the prices vary, and of course the prices vary for the same localities from time to time. There is then the liability that the cards may not be supplied at the proper time, and also the objection that the figures on the computing card are so small that the customer purchasing gasoline from a dispensing station cannot see the numerals from his automobile, there being grave dangers of error in either case. There is a further objection that the prices on these cards are only for full gallon units, and if a fraction of a gallon is dispensed there is no way of accurately determining the cost of this amount. Also, in meter pumps there is no positive way to dispense only a unit, and so in case the registering hand of the usual register overruns the unit measure, either the customer has to pay an estimated amount, or the service station owner has to lose this fraction of a unit to the customer In order to provide a liquid dispensing apparatus which will fulfill all service requirements, a computing pump has been devised wherein both price and the amount dispensed are indicated. This pump consists essentially of a motor driven pump, a meter, and a dispensing hose connected to the meter through a sight gauge, the meter being preferably of the displacement type for operating the indicating device.

The indicating device includes a variator which provides a ready adjustment between the amount computing portion of the meter and the price computing portion. In order to indicate the current price, numeral wheels or other indicating means are provided above the meter so that the customer can readily see the prevailing price. As the current price changes, it is of course necessary to reset the computing device or the variator whereby a proper compensation is provided between the price and the amount; and in the present application means is provided between the current price indicating means and the variator whereby the current price is regulated and controlled directly by the setting means of the variator.

It is therefore an object of this invention to provide a liquid dispensing apparatus which itself registers both the amount of liquid dispensed and also registers the total price of such liquid dispensed.

Another object is to provide a liquid dispensing apparatus wherein means is provided for indicating the total price of any amounts of liquid dispensed, as for example gallons or fractions thereof, the means being adjustable at the liquid dispensing apparatus to correspond to any price variations of units dispensed.

A further object is to provide a readily adjustable variator means, and operating means interposed between said variator means and the current price indicating means whereby the current price indicating means is regulated by the variator means.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation of a liquid dispensing apparatus embodying the invention;

Figure 2 is an enlarged fragmentary elevation through the variator, the indicator, and the current price indicia;

Figure 3 is an enlarged fragmentary side elevation of the mechanism illustrated in Figure 2;

Figure 8 is a sectional top plan view of the differential gearing of the variator.

Figure 4:
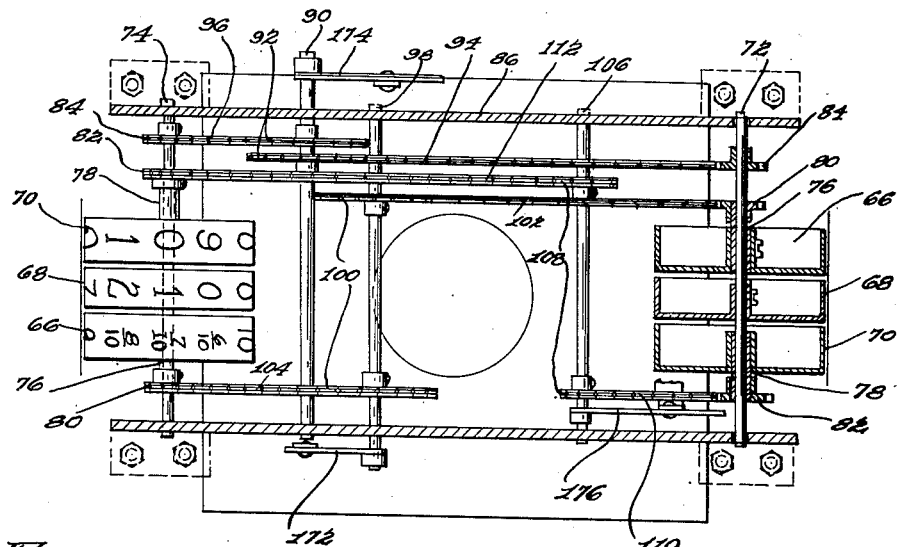
Figure 4 is a top plan view of the current price indicating means illustrated in Figures 1, 2 and 3.
Figure 5:
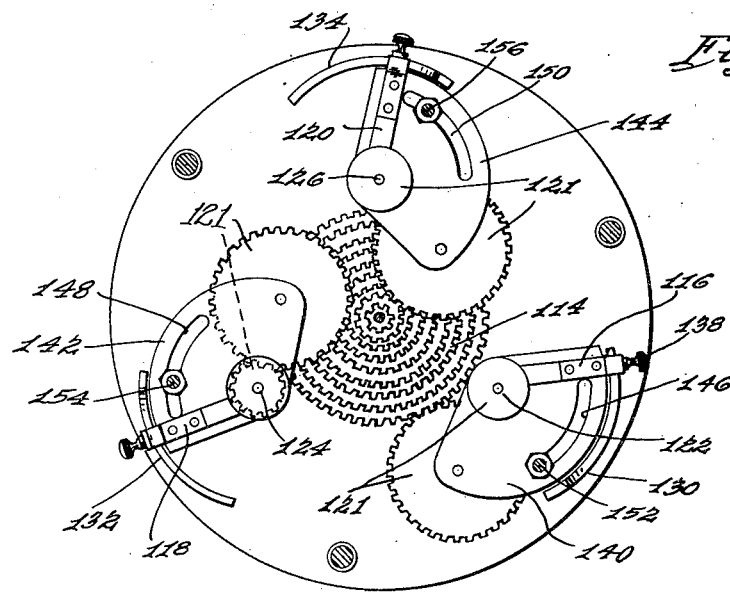
Figure 5 is a top plan view taken substantially in a plane through the variator, illustrating the connection between the variator and the current price indicating means.

This application is a division of application Serial No. 717,495, filed March 26, 1934.

The liquid dispensing apparatus 20, as illustrated, includes a casing 22 supported on a pedestal 24, and the pump 26 connected on the suction side thereof to the pipe 28 which is in communication with a source of liquid supply 30 through the foot valve 32. The pump 26 is adapted to be operated by the motor 34 through suitable means such as the belt 36, the pump being controlled through a suitable switch (not shown) operated from a hose hook or support 38. The outlet side of the pump 26 is connected to the pipe 40 connected to the inlet side of the meter 42 which may be of the piston displacement type. The meter may be of any suitable type accurately measuring the amount of liquid passing therethrough and supplied thereto, the liquid passing through the pipe 44 to the sight gauge 46 and being dispensed through the hose 48 and the hand operated nozzle 50.

As shown in Figure 1, the nozzle is supported on the hook 38 in which position the motor 34 is inoperative. In order to operate the motor it is necessary to remove the nozzle 50 from the hook 38 and raise said hook, and it is necessary for measuring operation of the meter that the valve in nozzle 50 be operated to permit flow of liquid therethrough. Operation of the meter 42 operates or rotates the shaft 52, the shaft being rotatable to operate the mechanism for operating the register 54. The casing of the register 54 is provided with two windows 56 and 58, the price indicating means being viewed through the window 56, and the volume or amount of gallons dispensed being viewed through the window 58. Interposed between the shaft and the register operating mechanism, the speed variator 60 is provided, the variator being particularly shown and described in Patent No. 2,111,996 to Edward A. Slye, granted March 22, 1938. The indicator consists of the well known numeral wheels serially operated by transfer mechanism of the Geneva type, the entire counter mechanism being of a well known type.

The register 54 is provided with numeral wheels showing on each side of the pump, interconnecting means being provided between opposite sides of the pump whereby the numeral wheels on each side are operated simultaneously and each show the exact same amount of liquid dispensed and the price thereof. Above the register 54 the windows 62 and 64 are provided above each register face and on each side of the pump, these windows being for the purpose of indicating the current price. Three numeral wheels 66, 68 and 70 are provided at each window for indicating the fractions, and cents and the tens of cents, and are the daily price wheels for the three wheels in window 56 which show the computed price in fractions, cents and tens of cents.

The numeral wheels 66, 68 and 70 are mounted on the shafts 72 and 74 disposed on opposite sides of the pump and journaled in suitable supports provided therefor. Each of the center or unit numeral wheels 68 is secured directly to the shafts 72 and 74. The sleeves 76 and 78 are rotatably mounted on the shafts 72 and 74, and the fractions numeral wheels are secured directly to the sleeves 76, and the tens numeral wheel is secured directly to the sleeves 78. The sleeves 76 are provided with the gears 80, non-rotatably mounted on said sleeves, and the sleeves 78 are provided with the gears 82 non-rotatably mounted on said sleeves, the shafts 72 and 74 being provided with the gears 84 non-rotatably mounted thereon.

The mounting or supports for the shafts 72 and 74 may conveniently be made by means of the frame 86 secured to suitable brackets 88 secured to the casing 22, and a shaft 90 is suitably journaled in the frame 86 and is provided with a pair of similar gears 92 non-rotatably mounted thereon and connected through suitable means such as the chains or belts 94 and 96 to the gears 84 mounted on the respective shafts 72 and 74. The shaft 90 then controls rotation of the shafts 72 and 74, and thereby controls rotation of the units or cents numeral wheels 68. A shaft 98 is journaled in the frame 86, and said shaft is provided with the similar gears 100 non-rotatably mounted on said shaft, said gears being connected through a suitable chain or belt drive 102 and 104 to the gears 80 mounted on the shafts 72 and 74. Thus the shaft 98 controls rotation of the fractions numeral wheel 66.

A third shaft 106 is journaled in the frame 86 and is provided with the similar gears 108 connected through a suitable chain or belt drive 110 and 112 to the gears 82 mounted on the shafts 72 and 74. Thus the shaft 106 controls rotation of the tens numeral wheels 70.

The variator 60 in the embodiment illustrated includes the cone gear 114 rotated by means of the shaft 52, the cone gear being selectively engaged by gearing provided on and movable with the shifting levers 116, 118 and 120, being respectively the fractions, cents and tens of cents, said shifting levers carrying said suitable gearing 121 and being slidably mounted on the shafts 122, 124 and 126 whereby rotation of these shafts is controlled, the motions thereof being differentially transmitted through the differential means 128 to the register whereby the computations are translated to the price numeral wheels at the window 56. The shifting levers 116, 118 and 120 are vertically movable on the respective cams 130, 132 and 134, some means such as the apertures 136 being provided in each of the cams engaged by the pins 138 on each of the gear shift levers for positioning the gear shift levers after the proper gear of the gear cone has been selected.

More particularly describing the variator, the gear shift levers are provided with pivoted gears 266, 268, 270 pivoted thereto as at 272, 274, 276, and adapted to mesh with the chosen gear steps on the cone 114 or with the teeth of the fixed gear 115 for zero setting of any shaft 122, 124 or 126. These gears respectively mesh with pinions 278, 280 and 282 slidably mounted between the spaced members of the arms 116, 118 and 120 on the shafts 122, 124 and 126. While these gears are slidably mounted on these shafts, they are non-rotatably mounted thereon so that rotation is transferred to these shafts from the cone. These shafts are provided with the pinions 236, 238 and 240 which respectively mesh with the spur gears 382, 388 and 302 whereby motion is imparted to these spur gears from the respective shafts. The spur gear 382 is provided with the bearing 384 having the gear teeth 386 disposed adjacent the upper end thereof, said bearing rotatably supporting the hub of the spur gear 388. The spur gear 388 of the differential gearing 128 is provided with the spiders or driving gears differentially arranged as at 390 pivotally mounted as at 392 on the gear 388.

The pinions are provided with lower gear steps 391 meshing with the gearing 386, and upper smaller gear steps 393 meshing with the gear 396. The gear 396 is provided on the bearing 398 rotatably supporting the spur gear 302, said spur gear being provided with the driving gears 308, the lower steps thereof meshing with the gear teeth 310 provided on the bearing member 398. The upper gear steps 312 mesh with the gear 314 provided on the rotatable member or thimble 316. The upper end thereof is provided with gear teeth 318 meshing with the gear 320 disposed on the shaft 322. The shaft 322 extends upwardly into the register mechanism and is provided with a bevel gear 324 meshing with the bevel gear 326 which is geared as at 328 to the gearing 330 of the upper numeral wheels 332 provided with the cost indicia, these wheels being viewed through the windows 56 of the registering mechanism 54.

Any suitable transfer mechanism such as the Geneva motion may be provided for progressively rotating the wheels, this motion being well known. The meter shaft 52 is provided with the bevel gear 334 meshing with the bevel gear 336, which in turn is geared as at 338 to suitable gearing 340 of the numeral wheels 342 having the volume indicia thereon, these numeral wheels being viewed through the windows 58 of the register. As before, suitable transfer mechanism serially drives the successive numeral wheels. That is, one rotation of the lowest numeral wheel is necessary to move the succeeding numeral wheel one indicia, and so on.

Figure 6:
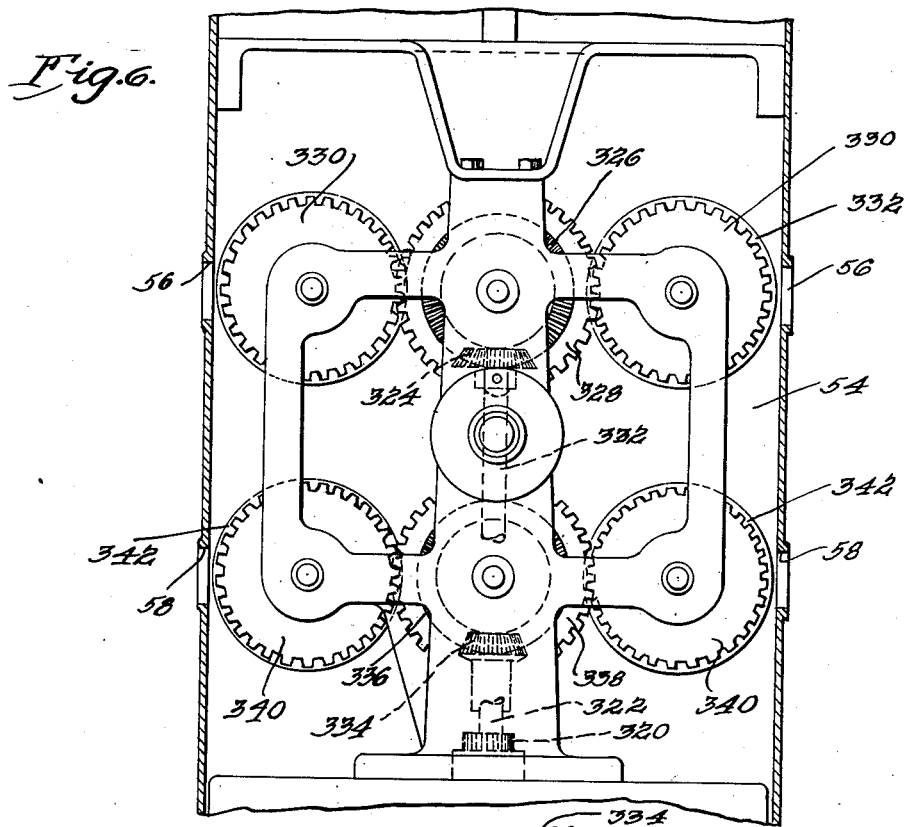
Figure 6 is a sectional elevation diagrammatically showing the upper and lower banks of numeral wheels of the register and indicating the connection between the register and the variator shown generally in Figure 2.
Figure 7:
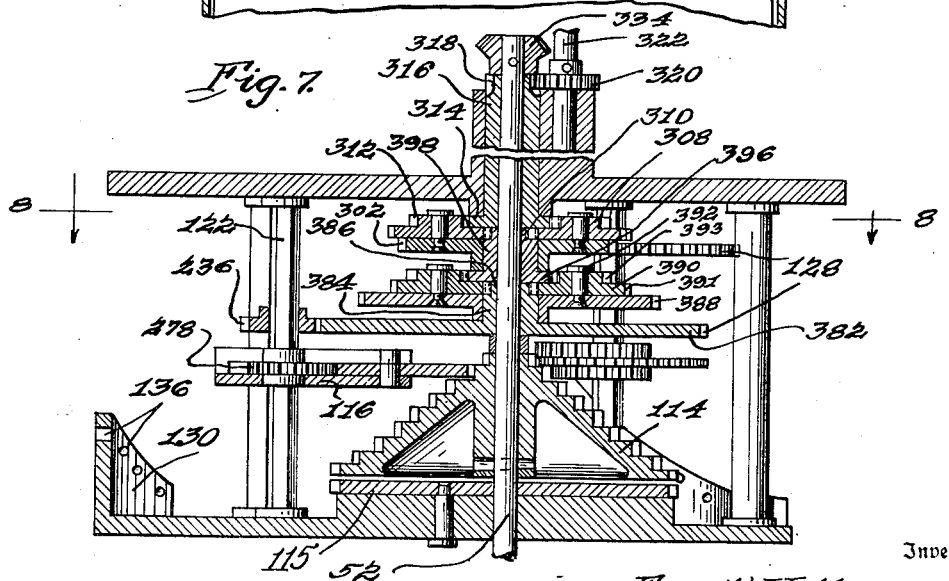
Figure 7 is a vertical sectional elevation through the variator shown generally in Figure 2, the same being taken substantially at 90 degrees to the view as illustrated in Figure 6.

It is noted that the connection between the gear shifting levers and the daily price is omitted in Figures 6, 7 and 8 for the sake of clearness, as these are particularly to be described with respect to Figures 1 to 5 inclusive. It is also to be noted that to make for clearness the cover plate between the gear cone and the differential gearing is omitted in Figure 7. Figure 7 is taken substantially at 90 degrees to Figure 2.

In order to associate the setting of the variator with the current price indications, the gear shift levers are provided with the quadrants 140, 142 and 144, each of said quadrants being affixed thereto and provided with the arcuate slots 146, 148 and 150 receiving the connecting rods 152, 154 and 156, said rods being slidably secured in said slots as by means of the spaced securing nuts 158 whereby vertical movement of the gear shift levers causes the same vertical movement to the connecting rods. The upper ends of the respective connecting rods are provided with the pins 160, 162 and 164 receivable in suitable slots 166, 168 and 170 provided in the levers 172, 174 and 176, said levers being non-rotatably mounted on the shafts 98, 90 and 106 respectively.

It will thus be readily appreciated that when it is desired to change the current price, the operator has only to move the gear shift levers 116, 118 and 120 to the desired positions for selectively engaging the gears carried thereby with the selected gear of the gear cone or the stationary gear if any zero setting of any gear shift lever is desired. Movement of the gear shift levers causes a corresponding vertical movement in the respective connecting rods 152, 154 and 156, the change in rotatable position between the quadrants 140, 142 and 144 and the connecting rods being compensated by means of the slots whereby this vertical movement is translated through the respective levers 172, 174 and 176 to cause the desired rotation of the shafts 98, 90 and 106 whereby these shafts cause rotation of the shafts 72 and 74, and the sleeves 76 and 78 whereby the numeral wheels 66, 68 and 70 are caused to indicate the current price corresponding to the position of the gear shift levers.

Thus a positive means is provided for indicating the current price and assuring that the proper current price is indicated for the amount of liquid dispensed. It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is—

1. In a device of the character described, the combination of a rotatable shaft, a sleeve rotatably mounted thereon, stationary means mounted adjacent said shaft, concentric gears of different size mounted on said shaft, a gear rotatably mounted on said shaft and provided with a bearing portion having a gear thereon, a gear of different size from said third named gear mounted on said bearing portion and having a spur gear rotatably mounted thereon and having operative engagement with said fourth named gear, a bearing sleeve rotatably mounted on said shaft and having a gear portion having operative engagement with a gear portion of said spur gears, said bearing sleeve having a gear thereon, a gear of different size from said third and fifth named gears and having a spur gear rotatably mounted thereon and having operative engagement with said second named gear of said bearing sleeve, said first named sleeve having a gear portion in operative relation to a gear portion of said last named spur gears, a plurality of rotatable shafts mounted adjacent said first named shaft, a gear on each of said shafts respectively meshing with said third, fifth and eighth gears, shifting levers slidably mounted on each of said last named shafts, said levers having gears thereon engageable with selected gear steps of said concentric gears for causing varied rotation of said last named shafts, the gears on said levers being engageable with said stationary means for selectively rendering any of the shafts of said levers inoperative, indicating means for indicating the selected concentric gear or stationary means engaged by the gears on said shifting levers, and connection means between said indicating means and said shifting levers whereby the selective engagement of the selected concentric gear or stationary means by the gears on said sihfting levers is shown by said indicating means.

2. In a device of the character described, the combination of a rotatable shaft, a sleeve rotatably mounted thereon, stationary means mounted adjacent said shaft, a cone gear mounted on said shaft and being provided with a plurality of varying gear steps, a gear rotatably mounted on said shaft and provided with a bearing portion having a gear thereon, a gear of different size from said third named gear mounted on said bearing portion and having a plurality of spur gears rotatably mounted thereon and having operative engagement with said fourth named gear, a bearing sleeve rotatably mounted on said shaft and having a gear portion having operative engagement with a gear portion of said spur gears, said bearing sleeve having a gear thereon, a gear of different size from said third and fifth named gears and having a plurality of spur gears rotatably mounted thereon and having operative engagement with said second named gear of said bearing sleeve, said first named sleeve having a gear portion in operative relation to a gear portion of said last named spur gears, a plurality of rotatable shafts mounted adjacent said first named shaft, a gear on each of said shafts respectively meshing with said third, fifth and eighth gears, shifting levers slidably mounted on each of said last named shafts, said levers having gears thereon engageable with selected gear steps of said cone gear for causing varied rotation of said last named shafts, the gears on said levers being engageable with said stationary means for selectively rendering any of the shafts of said levers inoperative, means for indicating the selected gear steps or stationary means engaged by the gears on said shifting levers, and a connection between said last named means and said shifting levers whereby operation of said levers operates said means.

3. In a device of the character described, the combination of a rotatable shaft, a plurality of concentric gears of different diameter mounted on said shaft to be rotated thereby, registering mechanism, a supplemental shaft mounted adjacent said first named shaft, a lever slidably mounted on said supplemental shaft and having gear means selectively engageable with said concentric gears, an operative connection between said gear means and said supplemental shaft whereby rotation of said rotatable shaft causes rotation of said supplemental shaft, connecting means between said supplemental shaft and said registering mechanism, and indicating means operatively connected to said lever for showing the setting of said lever.

4. In a device of the character described, the combination of speed variating means, indicating means adapted to show the setting of said speed variating means, setting means for varying the speed variating means and indicating means, said setting means including a member movable in one direction for rendering said variating means inoperative and thereafter movable to set said variating means, and means operatively connecting said member and said indicating means whereby movement of said member correspondingly moves said indicating means.

5. In a device of the character described, the combination of a driving shaft, speed variating mechanism driven by said shaft, said speed variating mechanism including adjustable means for varying the setting of said speed variating mechanism, setting means for setting said speed variating mechanism including an operating member, means operatively associated with said operating member and said adjustable means, said setting means being operative in one direction for causing said adjustable means to be moved to render said speed variating mechanism inoperative, and movement of said setting means in another direction causing said adjustable means to be moved to a position to differently set the speed variating mechanism.

6. In a device of the character described, the combination of a driving shaft, speed variating mechanism driven by said shaft, said speed variating mechanism including adjustable means for varying the setting of said speed variating mechanism, setting means for setting said speed variating mechanism including an operating member, means operatively associated with said operating member and said adjustable means, said setting means being rotated for causing said adjustable means to be moved to render said speed variating mechanism inoperative, said setting means being bodily moved for causing said adjustable means to be moved to a position to differently set the speed variating mechanism.

7. In a device of the character described, the combination of a driving shaft, speed variating mechanism driven by said shaft, said speed variating mechanism including adjustable means for varying the setting of said speed variating mechanism, setting means for setting said speed variating mechanism including an operating member, means operatively associated with said operating member and said adjustable means, said setting means being operative in one direction for causing said adjustable means to be moved to render said speed variating mechanism inoperative, movement of said setting means in another direction causing said adjustable means to be moved to a position to differently set the speed variating mechanism, indicating means for visibly showing the setting of said speed variating mechanism, and a connection between said setting means and said indicating means.

8. In a device of the character described, the combination of a drive shaft, a driven shaft, differential means operatively connected to said driven shaft, variable gear means interposed between said drive shaft and differential means, the axes of said shafts and the gears of said variable gear means being parallel, setting means movable to vary the setting of said variable gear means, indicating means movable to show the setting of said variable gear means, and connecting means between said indicating means and setting means whereby the indicating means is moved to show the selected variable gear means effective between said drive and driven shafts.

FRANK V. MAYO.